United States Patent [19]

Weber et al.

[11] 3,917,690

[45] *Nov. 4, 1975

[54] BENZENESULFONYL UREAS AND PROCESS FOR THEIR MANUFACTURE

[75] Inventors: Helmut Weber, Frankfurt am Main; Walter Aumüller, Kelkheim Rudi Weyer, Frankfurt am Main; Karl Muth, Kelkheim Felix Helmut Schmidt, Mannheim-Neuostheim, all of Germany

[73] Assignee: Hoechst Aktiengesellschaft, Frankfurt am Main, Germany

[ * ] Notice: The portion of the term of this patent subsequent to July 8, 1986, has been disclaimed.

[22] Filed: Feb. 2, 1971

[21] Appl. No.: 112,063

Related U.S. Application Data

[63] Continuation of Ser. No. 681,116, Nov. 7, 1967, abandoned.

[52] U.S. Cl. .................... 260/553 DA; 424/322
[51] Int. Cl.² ...................................... C07C 127/16
[58] Field of Search ........................... 260/553 DA

[56] References Cited
UNITED STATES PATENTS

| | | | |
|---|---|---|---|
| 3,448,149 | 6/1969 | Aumüller | 260/553 DA |
| 3,454,635 | 7/1969 | Weber et al. | 260/553 DA |

FOREIGN PATENTS OR APPLICATIONS

| | | | |
|---|---|---|---|
| 654,561 | 4/1965 | Belgium | 260/553 D |

*Primary Examiner*—Gerald A. Schwartz
*Attorney, Agent, or Firm*—Curtis, Morris & Safford

[57] ABSTRACT

N-[4-(β-benzamido-ethyl)-benzenesulfonyl]-N'-(endoalkylene-cyclohexyl- or cyclohexenyl)-ureas being substituted at the benzamido group and having hypoglycemic activity.

11 Claims, No Drawings

BENZENESULFONYL UREAS AND PROCESS FOR THEIR MANUFACTURE

This application is a streamlined continuation of Ser. No. 681,116 filed Nov. 7, 1967, and now abandoned.

The present invention relates to benzenesulfonyl-ureas corresponding to the formula

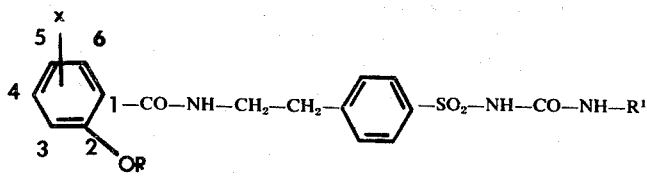

which as such or in the form of their physiologically tolerable salts show hypoglycemic properties and are characterized by a strong hypoglycemic action.

In the formula

R represents lower alkyl, preferably methyl or lower alkenyl,

X represents hydrogen, fluorine, chlorine or bromine, preferably chlorine, lower alkyl, preferably methyl or lower alkoxy, preferably methoxy, $R^1$ represents endomethylene-cyclohexyl, endomethylene-cyclohexenyl, endoethylene-cyclohexyl, endoethylene-cyclohexenyl. The substitutent X is in 4- or preferably in 5-position to the carbonamide group.

In the above and the following definitions "lower alkyl, alkenyl or alkoxy" always stands for an alkyl, alkenyl or alkoxy group containing 1 to 4 carbon atoms in a straight or branched chain.

According to the above-mentioned definitions R may represent, for example, methyl, ethyl, propyl, isopropyl, butyl, isobutyl, tert.butyl, allyl.

In particular $R^1$ may represent 2.5-endomethylenecyclohexenyl, 2.5-endomethylenecyclohexyl, 2.5-endoethylenecyclohexyl, 2.5-endoethylenecyclohexenyl.

The present invention relates furthermore to a process for the preparation of said benzenesulfonyl-ureas wherein a. benzenesulfonyl-isocyanates, benzenesulfonyl-carbamic acid esters, benzenesulfonyl-thiolcarbamic acid esters, benzenesulfonyl-carbamic acid halides or benzenesulfonyl-ureas, benzenesulfonyl-semicarbazides or benzenesulfonyl-semicarbazones substituted in p-position by the group

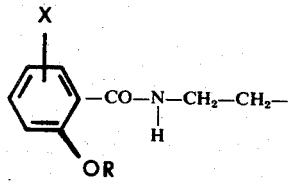

are reacted with $R^1$-substituted amines or, if desired, the salts thereof, b. benzenesulfonamides of the formula

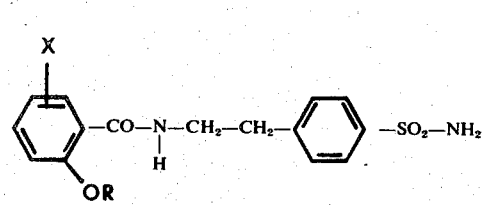

or their salts are reacted with $R^1$-substituted isocyanates, carbamic acid esters, thiolcarbamic acid esters, carbamic acid halides or ureas, c. correspondingly substituted benzenesulfonyl-isourea ethers, benzene-sulfonyl-isourea esters, benzenesulfonyl- isothiourea ethers, benzenesulfonyl-parabanic acids or benzenesulfonyl-haloformic acid amidines are hydrolyzed, d. correspondingly substituted benzenesulfonyl-halides are reacted with $R^1$-substituted ureas, in particular their alkaline metal salts, e. correspondingly substituted benzenesulfinic acid halides or, in the presence of acid condensing agents even correspondingly substituted benzenesulfinic acids or their alkaline metal salts, are reacted with hydroxy ureas the $NH_2$ group of which being substituted by $R^1$, f. to correspondingly substituted carbodiimides water is added, g. in correspondingly substituted benzenesulfonyl-thioureas the sulfur atom is exchanged for an oxygen atom, h. correspondingly substituted benzenesulfinyl-ureas or benzenesulfenyl-ureas are oxidized, i. corresponding benzenesulfonyl-ureas containing in the molecule unsaturated linkages are hydrogenated, k. in benzenesulfonyl-ureas of the formula

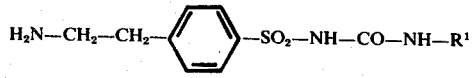

the radical

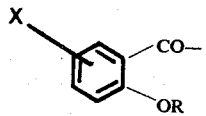

is introduced by acylation, if desired in several stages, l. in correspondingly substituted thiobenzamidoalkylbenzene-sulfonyl-ureas or -benzenesulfonyl-thioureas the sulfur atom or the sulfur atoms are exchanged by an oxygen atom or oxygen atoms, or m. compounds of the formula

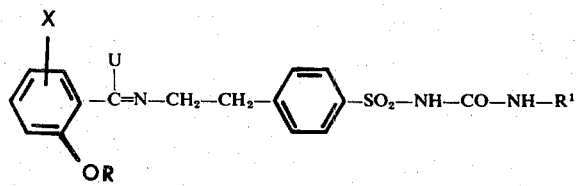

or their parabanic acid derivatives or compounds of the formula

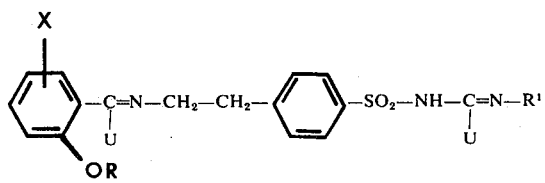

wherein U represents O-lower alkyl, S-lower alkyl or halogen (preferably chlorine) are saponified, and the reaction products are treated with alkaline agents, if the formation of salts is desired.

The above-mentioned benzenesulfonyl-carbamic acid esters or the benzenesulfonyl-thiolcarbamic acid esters may contain in the alcohol component an alkyl radical or an aryl radical or a heterocyclic radical. Since this radial is split off during the reaction, its chemical constitution has no influence on the character of the final product and can therefore vary within wide limits. The same applies to the $R^1$-substituted carbamic acid esters or the corresponding thiolcarbamic acid esters.

As carbamic acid halides there are suitable, above all, the chlorides.

The benzenesulfonyl-ureas used as starting substances for the process of the invention may be unsubstituted at the side of the urea molecule opposite to the sulfonyl group or may be mono- or preferably di-substituted. Since these substituents are split off during the reaction with amines, their nature can vary within wide limits. Instead of benzenesulfonyl-ureas substituted by an alkyl, aryl, acyl or heterocyclic radical, there can likewise be used the Bis-(benzenesulfonyl)-ureas, which may carry a further substituent at one nitrogen atom, for example methyl. It is, for example, possible to treat such bis-(benzenesulfonyl)-ureas or N-benzenesulfonyl-N'-acyl-ureas with amines of the formula $R^1NH_2$ and to heat the salts so obtained to an elevated temperature, particularly to a temperature above 100°C.

Furthermore, it is possible to start from ureas of the formula $R^1$-NH-CO-NH$_2$ or from such ureas which are mono- or, in particular di-substituted at the free nitrogen atom and to react these with benzenesulfonamides substituted by the grouping

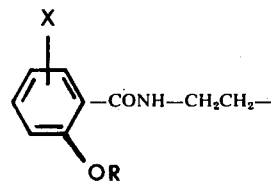

As such starting substances are appropriate, for example, N-endomethylenecyclohexyl, or N-endomethylenecyclohexenyl-urea, the corresponding N'-acetyl- or N'-nitro-ureas, N'-endomethylenecyclohexylureas, N'-endomethylenecyclohexenyl-ureas, N', N'-diphenyl-ureas (in which case the two phenyl radicals may be substituted and may be linked with one another directly or by means of a bridge member such as —CH$_2$, —NH— —O— or —S,) N'-methyl-N'-phenyl- or N', N'-dicyclohexyl-ureas as well as $R^1$-substituted cyclohexyl carbamoyl-imidazoles or triazoles.

Hydrolysis of the mentioned benzenesulfonyl-parabanic acids, benzenesulfonyl-isourea-ethers, benzenesulfonyl-thio-urea-ethers, benzenesulfonyl-isourea-esters or benzenesulfonyl-haloformic acid amidines is suitably carried out in an alkaline medium. Isourea-ethers and isourea-esters can be hydrolysed successfully in an acid medium, too.

The reaction with the benzenesulfonic halides with $R^1$-substituted ureas is suitably carried out by using basic condensing agents such as alkali metals, alkali amides or, preferably, -hydrides in indifferent solvents.

The reaction of the sulfinic acids or sulfinic acid chlorides with hydroxy ureas can suitably be carried out in indifferent solvents. If the sulfinic acids or their alkali metals are used as starting substances, acid condensing agents such as for example thionyl chloride, polyphosphoric acids, anhydrous phosphoric acid or sulfuric acid are added.

The sulfur atom in correspondingly substituted benzenesulfonyl-thioureas can be replaced by an oxygen atom, in known manner, for example with the aid of oxides or salts of heavy metals or likewise by applying oxidizing agents such as hydrogen peroxide, sodium peroxide or nitrous acid.

Thioureas may also be desulfurized by treating them with phosgene or phosphorus pentachloride. Chloroformic acid amidines or carbodiimides obtained as intermediate products can be converted into the benzenesulfonyl-ureas by suitable processes such, for example, as saponification or addition of water.

The oxidation of the benzenesulfinyl- or -sulfenylureas can be carried out with the known oxidizing agents such as for example potassium permanganate in indifferent solvents.

Correspondingly substituted benzenesulfonyl-ureas, containing in the molecule an unsaturated bond, for example

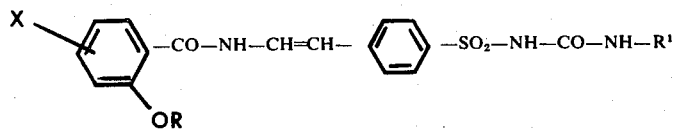

can be converted by hydrogenation for example with molecular hydrogen in the presence of a known hydration catalyst in the benzenesulfonyl-ureas according to the present invention.

The acylation of aminoethyl-benzenesulfonyl-ureas may be carried out either in one step, for example, by reaction of a correspondingly substituted benzoic acid halide, or it may be carried out in several steps. One example of the numerous possibilities of stepwise acylation is the reaction of aminoethyl-benzenesulfonyl-ureas with 2-methoxy-benzoyl chloride and subsequent introduction of a halogen atom into the benzene nucleus of the benzamido group.

The sulfur atoms in correspondingly substituted thiobenzamido-ethyl-benzenesulfonyl-ureas or thiobenzamidoethylbenzenesulfonyl-thioureas can be replaced by oxygen atoms for example, with the aid of oxidizing agents such as hydrogen peroxide, sodium peroxide or other peroxide compounds.

Instead of the thiobenzamido-ethyl-benzenesulfonyl-ureas the corresponding thiobenzamidoethyl-benzenesulfonyl-isothiourea-ethers, isourea-ethers or -esters, -parabanaic acids or thiobenzamidoethyl-benzenesulfonyl-haloformic acid amidines can be desulfurized by treatment with oxidizing agents in an acid or alkaline medium whereby simultaneously a desulfurization and a hydrolysis forming the sulfonyl-urea grouping occur and the benzamidoethyl-benzene-sulfonyl-ureas are obtained.

Instead of the thiobenzamido-ethyl-benzene-sulfonylthioureas, compounds of the formula

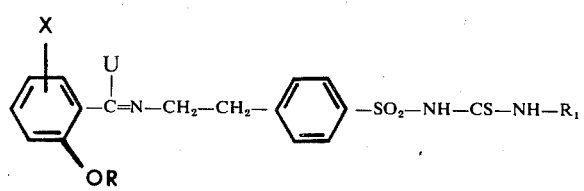

wherein U has the meaning given above, can be converted by treatment with oxidizing agents in an acid or alkaline medium by simultaneous desulfuration and hydrolysis into the corresponding benzamido-ethyl-benzenesulfonyl-ureas.

As regards the reaction conditions, the forms of realizing the process of the invention may, in general, vary within wide limits and can be adapted to each individual case. For example, the reactions can be carried out with the use of solvents either at room temperature or at an elevated temperature.

According to the nature of the starting substances, in some cases, one or the other mentioned process may yield a desired individual benzenesulfonyl-urea in only small amounts or might be inappropriate. Such relatively rare cases can easily be recognized by experts and it is not difficult to use successfully a method of synthesis other than that described.

As starting substances such compounds are used which contain a benzene nucleus being substituted by the group

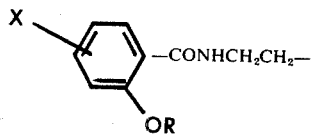

in para-position.

As examples for the part

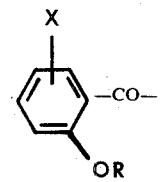

of this substituent may be mentioned in particular the following:

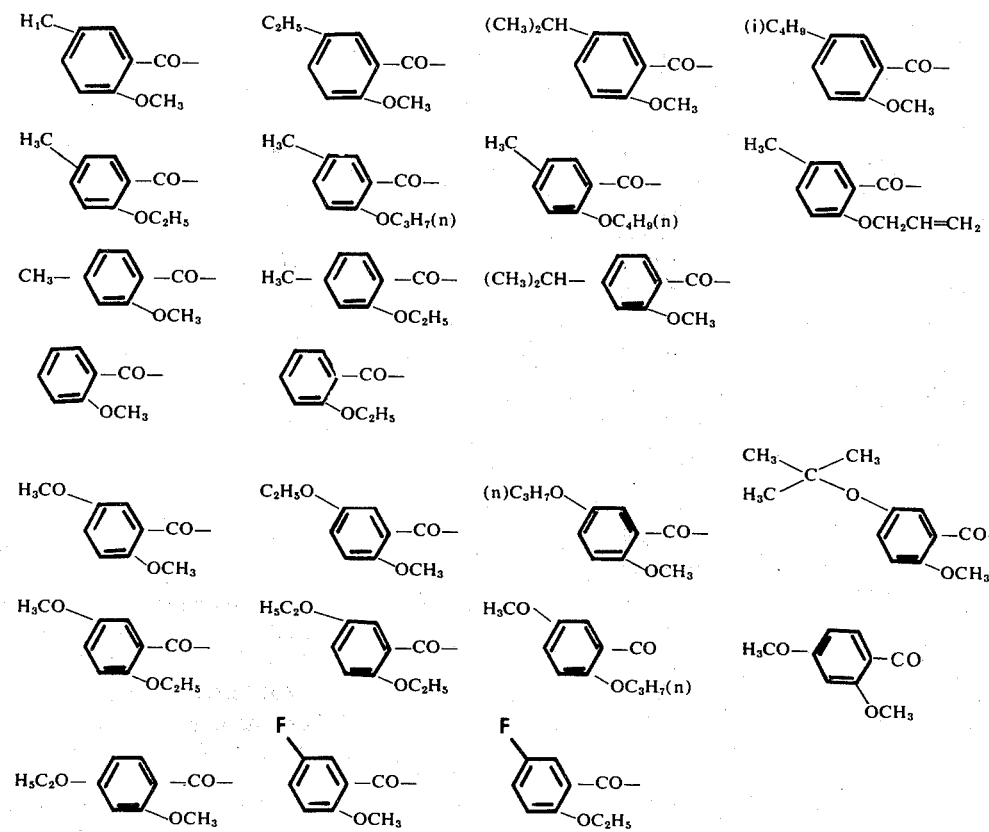

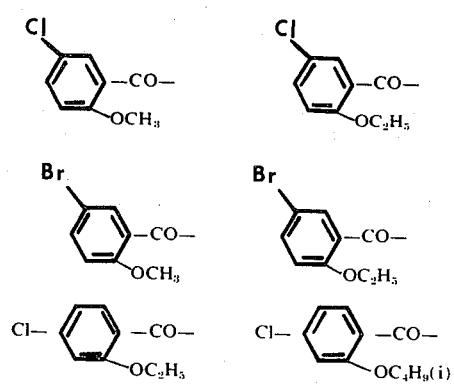
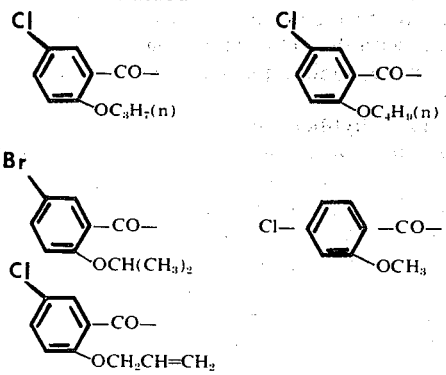

-continued

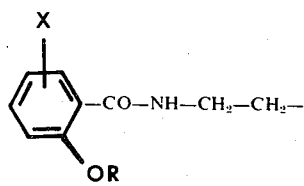

The preparation of the starting substances may be carried out according to generally known methods. Thus, for example benzenesulfonamides used as starting substances which are substituted in the benzene nucleus by the radical

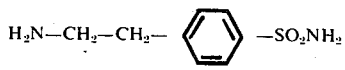

can be obtained by reaction of the corresponding benzene compounds with chloro-sulfonic acid and subsequently with ammonia or by acylation of amino compounds of the formula $$H_2N-CH_2-CH_2-\langle\ \rangle-SO_2NH_2$$

with corresponding acid chlorides.

The benzenesulfonyl carbamic acid esters and -ureas used as starting material can be obtained for example from benzenesulfonamides and halogenoformic acid alkyl esters or potassium cyanate (KOCN).

The hypoglycemic action of the benzene-sulfonyl-urea derivatives described above could be determined by feeding them to rabbits in doses of 10 mg/kg and determining the blood sugar value according to the known method by Hagedorn-Jensen or by means of an auto-analyzer over a prolonged period of time.

Thus, it was found, for example, that 10 milligrams/kilogram of N-[4-($\beta$-<2-methoxy-5-bromo-benzamido>-ethyl)-benzenesulfonyl]-N'-(2.5-endomethylene-cyclohexyl)-urea provoke, after 3 hours, a lowering of the blood sugar by 35 %, after 24 hours 26 % and after 48 hours 18 %.

In the same manner, 10 millilgrams of N-[4-($\beta$-<2-methoxy-5-chlorobenzamido->-ethyl)-benzene-sulfonyl]-N'-(2.5-endomethylene-cyclohexyl)-urea provoke after 3 hours a blood sugar lowering of 32 %, after 24 hours of 43 %, after 48 hours of 28 %, and even after 72 hours of 14 %, whereas the known N-[4-methyl-benzene-sulfonyl]-N'-butyl-urea, when administered to rabbits in doses of less than 25 mg/kg, does not provoke a lowering of the blood sugar level.

The strong hypoglycemic action of the benzenesulfonyl-ureas of the present invention becomes more evident if the dose is further reduced. When N-[4-($\beta$-<2-methoxy-5-bromo-benzamido>-ethyl)-benzenesulfonyl]-N'-(2,5-endomethylene-cyclohexyl)-urea is administered to rabbits in a dose of 0.01 mg/kg or N-[4-($\beta$-<2-methoxy-5-chloro-benzamido>-ethyl)-benzenesulfonyl]-N'-(2.5-endomethylene-cyclohexyl)-urea is administered to rabbits in a dose of 0.06 mg/kg, or the N-[4-($\beta$-<2-methoxy-5-methylbenzamido>-ethyl)-benzensulfonyl]-N'-(2.5-endomethylenecyclohexyl)-urea is administered to rabbits in a dose of 0.06 mg/kg, a distinct lowering of the blood sugar can still be observed.

The benzenesulfonyl-ureas described are preferably used for the manufacture of orally administrable pharmaceutical preparations for the lowering of the blood sugar level in the treatment of diabetes mellitus; they may be used as such or in the form of their physiologically tolerable salts or in the presence of substances which cause such salt formation. For the formation of salts there may be used, for example, alkaline agents such as alkali metal hydroxides or alkaline earth metal hydroxides, alkali metal carbonates or bicarbonates or alkaline earth metal carbonates or bicarbonates.

The pharmaceutical preparations are advantageously in the form of tablets containing, in addition to the products of the present invention, the usual pharmaceutically suitable carriers such as talc, starch, lactose, tragacanth or magnesium stearate.

A pharmaceutical preparation containing one of the aforesaid benzenesulfonyl-ureas as the active substance, for example, a tablet or a powder, with or without the aforesaid carriers, is advantageously brought into a suitable unit dosage form. The dose chosen should comply with the activity of the benzenesulfonyl-urea used and the desired effect. Advantageously, the dosage per unit amounts to about 0.5 to 100 mg, preferably 2 to 10 mg, but considerably higher or lower dosage units may also be used, which, if desired, are divided or multiplied prior to their administration.

The following Examples serve to illustrate the invention, but they are not intended to limit it thereto.

EXAMPLE 1

N-[4-($\beta$-<2-methoxy-5-chlorobenzamido>-ethyl)-benzenesulfonyl]-N'-(2,5-endomethylene-cyclohexyl)-urea 4.2 g of N-[4-($\beta$-<2-methoxy-5-chlorobenzamido>-ethyl)-benzenesulfonyl]-methyl-urethane (melting point 189° – 191°C) are suspended in 100 ml of dioxane and heated for about 1 hour to 110°C. When cooling, the N-[4-($\beta$-<2-methoxy-5-chlorobenzamido>-ethyl)-benzenesulfonyl]-N'-(2.5-endomethylenecyclohexyl)-urea formed, crystallizes which, after recrystallization from methanol melts at 187° – 189°C.

In analogous manner there are obtained: from
N-[4-(β-<2-methoxy-4-chlorobenzamido>-ethyl)-benzenesulfonyl]-carbamic acid methyl ester (melting point 178° – 180°C):
N-[4-(β-<2-methoxy-4-chlorobenzamido>-ethyl)-benzenesulfonyl]-N'-(2.5-endomethylenecyclohexyl)-urea, melting point 203° – 205°C (from methanol); from
N-[4-(β-<2-ethoxy-5-chlorobenzamido>-ethyl)-benzenesulfonyl]-carbamic acid methyl ester (melting point 203° – 205°C):
N-[4-(β-<2-ethoxy-5-chlorobenzamido>-ethyl)-benzenesulfonyl]-N'-(2.5-endomethylenecyclohexyl)-urea, melting point 158° – 160°C (from methanol); from
N-[4-(β-<2-methoxy-5-bromobenzamido>-ethyl)-benzenesulfonyl]carbamic acid methyl ester (melting point 197° – 199°C):
N-[4-(β-<2-methoxy-5-bromobenzamido>-ethyl)-benzenesulfonyl]-N'-(2.5-endomethylenecyclohexyl)-urea, melting point 171° – 172°C (from methanol/-dimethylformamide); from
N-[4-(β-<2-methoxy-5-methylbenzamido>-ethyl)-benzenesulfonyl]-carbamic acid methyl ester (melting point 175° – 177°C):
N-[4-(β-<2-methoxy-5-methylbenzamido>-ethyl)-benzenesulfonyl]-N'-(2.5-endomethylenecyclohexyl)-urea, melting point 191° – 193°C (from methanol/-dimethylformamide); from
N-[4-(β-<2.5-dimethoxy-benzamido>-ethyl)-benzenesulfonyl]-carbamic acid methyl ester (melting point 173° – 175°C):
N-[4-(β-<2.5-dimethoxy-benzamido>-ethyl)-benzenesulfonyl]-N'-(2.5-endomethylenecyclohexyl)-urea, melting point 163° – 165°C (from methanol); from
N-[4-(β-<2-methoxybenzamido>-ethyl)-benzenesulfonyl]-carbamic acid methyl ester (melting point 174° – 176°C):
N-[4-(β-<2-methoxybenzamido>-ethyl)-benzenesulfonyl]-N'-(2.5-endomethylenecyclohexyl)-urea, melting point 197° – 198°C (from methanol); from
N-[4-(β-<2-methoxy-5-fluorobenzamido>-ethyl)-benzenesulfonyl]-carbamic acid methyl ester (melting point 171° – 173°C):
N-[4-(β-<2-methoxy-5-fluorobenzamido>-ethyl)-benzenesulfonyl]-N'-(2.5-endomethylenecyclohexyl)-urea, melting point 206° – 207°C (from methanol/-dimethylformamide).

EXAMPLE 2

N-[4-(β-<2-methoxy-5-fluorobenzamido>-ethyl)-benzenesulfonyl]-N'-(2.5-endomethylenecyclohexyl)-urea 6 g of 4-(β-<2-methoxy-5-fluorobenzamido>-ethyl)-benzenesulfonamide (melting point 167° – 169°C) are dissolved in 8.5 ml of 2N sodium hydroxide solution and 50 ml of acetone, and 2.5 g of 2.5-endomethylenecyclohexyl-isocyanate are added dropwise at 0° – 5°C. Stirring is continued for 3 hours, water and methanol is added, the whole is filtered from the undissolved matter and the filtrate is acidified with dilute hydrochloric acid. The N-[4-(β-<2-methoxy-5-fluorobenzamido>-ethyl)-benzenesulfonyl]-N'-(2.5-endomethylenecyclohexyl)-urea which has precipitated, melts after recrystallization from methanol/-dimethylformamide at 206° – 207°C.

In analogous manner there is obtained: from
4-(β-<-2-n-propoxy-5-chlorobenzamido>-ethyl)-benzenesulfonamide (melting point 192° – 194°C):
N-[4-(β-<2-n-propoxy-5-chlorobenzamido>-ethyl)-benzenesulfonyl]-N'-(2.5-endomethylenecyclohexyl)-urea, melting point 171° – 173°C (from methanol); from
4-(β-<2-n-propoxy-5-methylbenzamido>-ethyl)-benzenesulfonamide (melting point 166° – 167°C):
N-[4-(β-<2-n-propoxy-5-methylbenzamido>-ethyl)-benzenesulfonyl]-N'-(2.5-endomethylenecyclohexyl)-urea, melting point 148° – 150°C (from methanol); from
4-(β-<2-methoxy-5-ethylbenzamido>-ethyl)-benzenesulfonamide (melting point 193° – 195°C):
N-[4-(β-<2-methoxy-5-ethylbenzamido>-ethyl)-benzenesulfonyl]-N'-(2.5-endomethylenecyclohexyl)-urea, melting point 162° – 164°C (from methanol).

EXAMPLE 3

N-[4-(β-<2-methoxy-5-chloro-benzamido>-ethyl)-benzenesulfonyl]-N'-(2.5-endomethylenecyclohexyl)-urea 2 g of N-[4-(β-<2-methoxy-5-chloro-benzamido>-ethyl)-benzenesulfonyl]-N'-(2.5-endomethylenecyclohexyl)-thiourea (prepared by boiling for several hours 4-(β-<2-methoxy-5-chlorobenzamido>-ethyl)-benzenesulfonamide and 2.5-endomethylenecyclohexyl mustard oil in acetone in the presence of potassium carbonate while stirring, melting point 158° – 160°C (from dilute methanol)) are dissolved in about 10 ml of 2N sodium hydroxide solution and 5 ml of dioxane. After addition of 5 ml of hydrogen peroxide of 35 % strength, the whole is heated for about 20 minutes in a water bath. After cooling it is acidified. There is obtained a crystalline precipitate which is filtered off with suction, dissolved in ammonia of about 1 % strength and reprecipitated after filtration by acidification. The thus obtained crude N-[4-(β-<2-methoxy-5-chlorobenzamido>-ethyl)-benzene-sulfonyl]-(2.5-endomethylenecyclohexyl)-urea melts after recrystallization from methanol at 186° – 188°C.

EXAMPLE 4

N-[4-(β-<2-methoxy-5-chlorobenzamido>-ethyl)-benzenesulfonyl]-N'-(2.5-endomethylenecyclohexyl)-urea a. 1 g. of N-[4-(β-<2-methoxy-5-chlorobenzamido>-ethyl)-benzenesulfonyl]-N'-(2.5-endomethylenecyclohexyl)-thiourea (cf. Example 3) is dissolved in 50 ml of ethanol. After addition of 0.5 g of mercury oxide and a small amount of potassium carbonate, the whole is heated to 50° – 60°C for 4 hours while stirring. It is filtered, concentrated and crystallized from dilute methanol. The thus obtained N-[4-(β-<2-methoxy-5-chlorobenzamido>-ethyl)-benzenesulfonyl]-N'-(2.5-endomethylenecylcohexyl)-isourea metehyl ether melts at 118° – 120°C.

b. 0.1 g of the product obtained according to 4a), is heated in 2 ml of dioxane and 10 ml of concentrated hydrochloric acid for 20 minutes in a vapour bath. The product which is obtained after pouring into water is filtered off with suction and recrystallized from dilute methanol. The N-[4-(β-<2-methoxy-5-chloro-benzamido>-ethyl)-benzenesulfonyl]-N'-(2.5-endomethylenecyclohexyl)-urea thus prepared melts at 186° – 188°C. The same product is obtained by alkaline saponification of the isourea ether prepared according to 4a) by heating for 1 hour with 2N sodium hydroxide solution in a vapour bath.

EXAMPLE 5

N-[4-(β-<2-methoxy-5-chlorobenzamido>-ethyl)-benzenesulfonyl]-N'-(2.5-endomethylenecyclohexyl)-urea a. 0.8 g of endomethylenecyclohexyl-parabanic acid (melting point 111° –113°C from dilute methanol) is dissolved in 30 ml of benzene, 0.4 g of trimethylamine and 1.6 g of 4-(β-<2-methoxy-5-chlorobenzamido>-ethyl)-benzenesulfonic acid chloride are added and heated to boil under reflux for 2½ hours. The whole is concentrated in vacuo, water is added to the residue obtained and it is triturated. The substance crystallizes after abandoning for some time. It is filtered off with suction, washed with water and recrystallized from methanol/dioxane. The thus obtained 1-[4-(β-<2-methoxy-5-chlorobenzamido>-ethyl)-benzenesulfonyl]-3-(2.5-endomethylene-cyclohexyl)-parabanic acid melts at 227° –229°C.

b. The product obtained according to 5a is dissolved in a small amount of dioxane and 2N sodium hydroxide solution and the solution is heated in a vapour bath for 45 minutes. After cooling it is diluted with water and acidified. The precipitate obtained of N-[4-(β-<2-methoxy-5-chloro-benzamido>-ethyl)-benzenesulfonyl]-N'-(2.5-endomethylenecyclohexyl)-urea melts after recrystallization from methanol/water at 186° – 188°C.

EXAMPLE 6

N-[4-(β-<2-methoxy-5-chlorobenzamido>-ethyl)-benzenesulfonyl]-N'-(2.5-endomethylenecyclohexyl)-urea a. 3.1 g of N-2.5-endomethylenecyclohexyl-urea are dissolved in pyridine, when introducing 7.4 g of 4-(β-<2-methoxy-5-chlorobenzamido>-ethyl)-benzenesulfinyl chloride slight heating occurs. The clear solution is added after 10 minutes to a mixture of ice water and dilute hydrochloric acid, the precipitate thus formed is filtered off with suction, and stirred with ammonia of 0.5 % strength. The amorphous precipitate is dissolved in acetone while hot. When cooling, the N-[4-(β-<2-methoxy-5-chlorobenzamido>-ethyl)-benzene-sulfinyl]-N'-(2.5-endomethylenecyclohexyl)-urea crystallizes, having a melting point of 133° – 135°C.

b. 1 g of the above-mentioned urea is dissolved in 20 ml of dimethyl-formamide and an aqueous potassium permanganate solution in excess is added to the bath. After filtration of the pyrolusite, water and dilute hydrochloric acid is added and the precipitate which has formed is recrystallized. There is obtained N-[4-(β-<2-methoxy-5-chlorobenzamido>-ethyl)-benzenesulfonyl]-N'-(2.5-endomethylenecyclohexyl)-urea melting at 187° – 189°C.

What is claimed is:

1. A benzenesulfonyl-urea corresponding to the formula

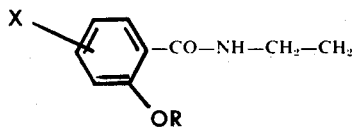

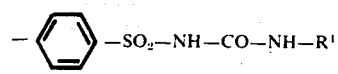

in which
R represents lower alkyl or lower alkenyl,
X represents chlorine, lower alkyl, or lower alkoxy, in 4- or 5-position to the carbonamide group,
R¹ represents endomethylene-cyclohexenyl, endomethylene-cyclohexyl, endoethylene-cyclohexyl, endoethylene-cyclohexenyl, and its salts of a pharmaceutically acceptable base.

2. A compound as claimed in claim 1, wherein R is methyl, X is chloride in 5-position and R¹ is 2.5-endomethylene-cyclohexyl.

3. A compound of the formula,

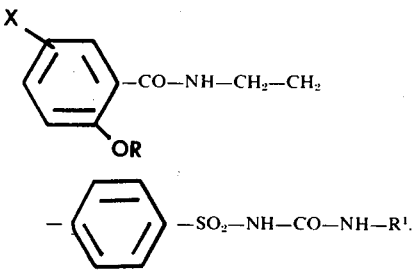

wherein R is methyl, X is bromine in 5-position and R¹ is 2.5 endomethylene-cyclohexyl.

4. A compound of the formula,

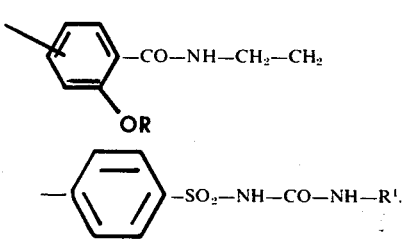

wherein R is methyl, X is methyl in 5-position and R¹ is 2.5 endomethylenecyclohexyl.

5. A compound as claimed in claim 1, wherein R is methyl, X is chlorine in 4-position and R¹ is 2.5 endomethylene-cyclohexyl.

6. A compound as claimed in claim 1, wherein R is ethyl, X is chlorine in 5-position and R¹ is 2.5 endomethylene-cyclohexyl.

7. A compound as claimed in claim 1, wherein R is methyl, X is methoxy in 5-position and R¹ is 2.5-endomethylene cyclohexyl.

8. A compound of the formula

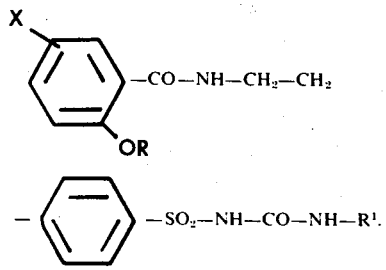

wherein R is methyl, X is fluorine in 5-position and R¹ is 2.5 endomethylene cyclohexyl.

9. A compound as claimed in claim 1, wherein R is n-propyl, X is chlorine in 5-position and R¹ is 2.5-endomethylene-cyclohexyl.

10. A compound as claimed in claim 1, wherein R is n-propyl, X is methyl in 5-position and $R^1$ is 2.5-endomethylene cyclohexyl.

11. A compound as claimed in claim 1, wherein R is methyl, X is ethyl in 5-position and $R^1$ is 2.5-endomethylene-cyclohexyl.

* * * * *

UNITED STATES PATENT AND TRADEMARK OFFICE
CERTIFICATE OF CORRECTION

PATENT NO. : 3,917,690
DATED : November 4, 1975
INVENTOR(S) : Weber et al.

It is certified that error appears in the above-identified patent and that said Letters Patent are hereby corrected as shown below:

In the Heading between Items [63] and [52], insert:

--[30] Foreign Application Priority Data

| | | |
|---|---|---|
| November 29, 1966 | Germany | F 50,793 |
| July 13, 1967 | Germany | F 52,939-- |

Signed and Sealed this seventeenth Day of February 1976

[SEAL]

Attest:

RUTH C. MASON
*Attesting Officer*

C. MARSHALL DANN
*Commissioner of Patents and Trademarks*